United States Patent [19]

Hendry

[11] 4,333,608

[45] Jun. 8, 1982

[54] INJECTION MOLDING NOZZLE

[75] Inventor: James W. Hendry, Englewood, Tenn.

[73] Assignee: Ex-Cell-O Corporation, Troy, Mich.

[21] Appl. No.: 188,799

[22] Filed: Sep. 19, 1980

[51] Int. Cl.³ .............................................. B29F 1/03
[52] U.S. Cl. ..................................... 239/118; 137/509;
239/533.1; 239/583; 425/146; 425/563;
425/564; 425/DIG. 227
[58] Field of Search ............... 239/118, 451, 452, 456,
239/533.1, 533.4, 533.8, 533.11, 551, 562, 583,
584; 222/595; 251/62; 137/509 X; 425/145,
146, 562–564, 566, DIG. 224, DIG. 227

[56] References Cited

U.S. PATENT DOCUMENTS 3,491,408  1/1970  Natkins ............................. 425/563
3,767,340 10/1973  Driscoll et al. ....... 425/DIG. 224 X
3,952,927  4/1976  Schaumburg et al. ......... 425/564 X Primary Examiner—Andres Kashnikow
Attorney, Agent, or Firm—Frank D. Risko; John C. Evans

[57] ABSTRACT

This invention is an improved injection molding nozzle whereby the shut-off plunger is operated by a fluid and the opening of the nozzle is accomplished by the flow of plasticized material through the nozzle. A control rod internal to the nozzle controls the movement of the plunger shut-off member and is adjustable so that the amount of plasticized resin flowing through the nozzle can be accurately controlled.

7 Claims, 4 Drawing Figures

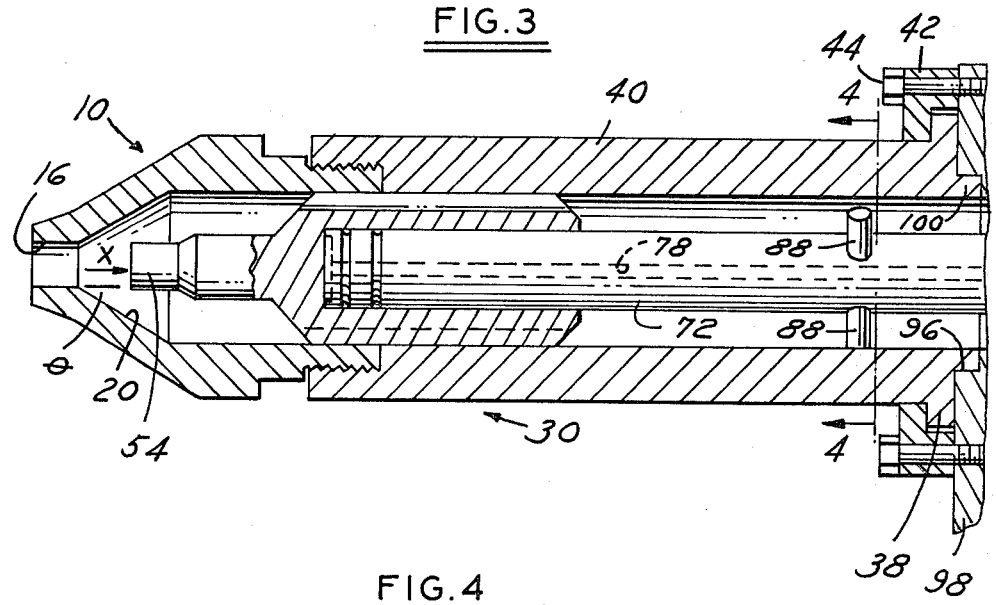
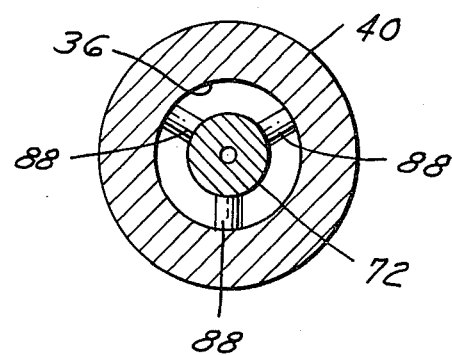

INJECTION MOLDING NOZZLE

BACKGROUND OF INVENTION

1. Field of Invention

This invention relates to the art of injection molding of resinous materials and, more particularly, to the opening and closing of an injection nozzle to achieve improved operation and control of the flow of plasticized material through the nozzle.

2. Description of Prior Art

In the manufacturing process of plastic parts a positive shut-off of the nozzle is very important to avoid drool from the nozzle into the mold cavity while the mold halves have been separated while the part is being removed. It is obvious that if the nozzle drools into the mold, the resin will partially solidify and upon the next injection molding step, the partially solidified resin will cause an anomaly in the part manufactured. Also hydraulic cylinders are used to actuate the nozzle rod with the attendant problems of hydraulic fluid leakage and high maintenance.

One type of nozzle shut-off is shown in U.S. Pat. No. 2,318,031 issued to Tucker. Here, the nozzle utilizes a rotary valve mounted at the output of the nozzle itself. This valve in turn is rotated by a hydraulic motor which disconnects a passage through the valve body to disconnect the flow of plasticized resin. Another valving method is shown in this patent wherein the opening of the nozzle is accomplished by a pure mechanical means. Here a valve closure has a rod connected to the valve protruding from the end of the nozzle. As the mold is closed, the rod engages the mold surface and opens the valve to allow material to flow into the mold. As the mold is opened the valve will shut off from the pressure of the resin inside the unit.

U.S. Pat. No. 3,231,938 issued to Seymour shows a spring operated nozzle means wherein the flow of plasticized resin will increase the pressure in the nozzle and cause the shut-off to be pushed against the spring, thus opening the entrance to the mold. Upon completion of the injection step, the pressure of the resin will be reduced and the spring will push the shut-off member back into its original position thereby disconnecting the flow of plasticized resin to the mold. Another U.S. Pat. No. 3,241,191 issued to Nouel shows a spring-lever type mechanical method for operating the shut-off valve whereby resin under pressure forces the nozzle shut-off to a mid-position acting to regulate the flow of resin through the tip of the nozzle. The valve is double acting and when the mold is filled the pressure of the resin inside the mold will force back the shut-off through a mechanical arm against a spring which shuts off the flow of resin to the mold. Here the flow of resin and spring biasing means are used to open and return the valve to its shut-off position.

U.S. Pat. No. 3,571,856 issued to Voelker shows a shut-off means whereby the control is by a hydraulic actuator which is connected to a rod inside a ball and socket connected to a manifold means having an orifice opening into the mold. The rod is capable of being moved to open or shut off the orifice to the mold. The rod operates as a valve to disconnect plasticized resin from flowing through the nozzle means through the orifice into the mold cavity.

Another means of shutting off or disconnecting the flow of plasticized resin through a nozzle is shown in U.S. Pat. No. 3,902,665 issued to Hendry, the instant inventor. This patent shows various nozzle shut-off means being operated by a fluid pressure to stop the flow of plasticized resin from the extruder into the nozzle itself. Here, the opening and closing of the nozzle shut-off means can be by a fluid means or the opening of the shut-off can be caused by the force of plasticized resin against the shut-off rod pushing the valve back to its seated position. The return to a closed position is by a compressed air or fluid means. U.S. Pat. No. 3,649,148 issued to Waltman shows a means for controlling the orifice of a nozzle which operates using a fluid means to control the wall thickness of plasticized resin as it is extruded from the nozzle in the manufacture of blow molded bottles.

My invention improves on the prior art by accurately controlling the flow of plasticized resin through the nozzle. This is accomplished by a control rod means which interacts with the shut-off plunger means. This control rod controls the length of movement of the shut-off plunger by controlling the distance or length of movement of the plunger which in turn controls the volumetric opening. The amount of plasticized resin that can flow through the nozzle and the nozzle tip is therefore accurately controlled. An adjusting means allows more or less resin to flow through the nozzle tip by adjusting the position of the control rod with respect to the plunger and its position relative to the volumetric flow. Through the center of the control rod is a bore which allows the input of fluid pressure to shut off the nozzle after the correct amount of resin has been injected into the mold. This method of shut-off utilizes either compressed air, nitrogen or some other fluid medium for forcing the plunger into the tip of the nozzle thereby discontinuing the flow of the plasticed resin.

In summary, my invention consists of an injection molding nozzle means having a slideable shut-off plunger which is accurately positioned on and interacts with a control rod means for controlling the volumetric flow of resin. The control rod passes through the center of the nozzle body and has a bore down the center of the control rod which exits into a chamber formed in the shut-off plunger. When the resin flow is first initiated this chamber is vented to atmosphere or to some low pressure, thereby allowing the pressure of the plasticized resin acting on a differential area to move the plunger to open the nozzle. The plunger will move until it bares against the end of the control rod and cannot move any additional distance. Upon completion of the cycle, the pressurization of this chamber allows the plunger to move forward shutting off the flow of plasticized resin.

It is an object of this invention to have the control rod adjustable by threaded means to control the length of movement of the plunger. Another object of the invention is to have the end of the plunger means flush with the end of the nozzle tip upon shut-off of the nozzle. It is an object of this invention to have guide pin means mounted to the control rod for spacing the rod internal to the nozzle body. It is the object of this invention to manufacture the nozzle so that it is directly mountable to a manifold member. It is an object of this invention to control the volumetric opening of the nozzle to acurately meter the flow of plasticized resin. It is the object of this invention to use a non-hydraulic means to operate the nozzle.

DESCRIPTION OF THE DRAWINGS

FIG. 3 is a cross-section of the injection molding nozzle assembly in its open most position.

FIG. 4 is a cross-section of the nozzle body taken along line 4—4 in FIG. 3.

DESCRIPTION OF PREFERRED EMBODIMENT

Figures 1, 2:
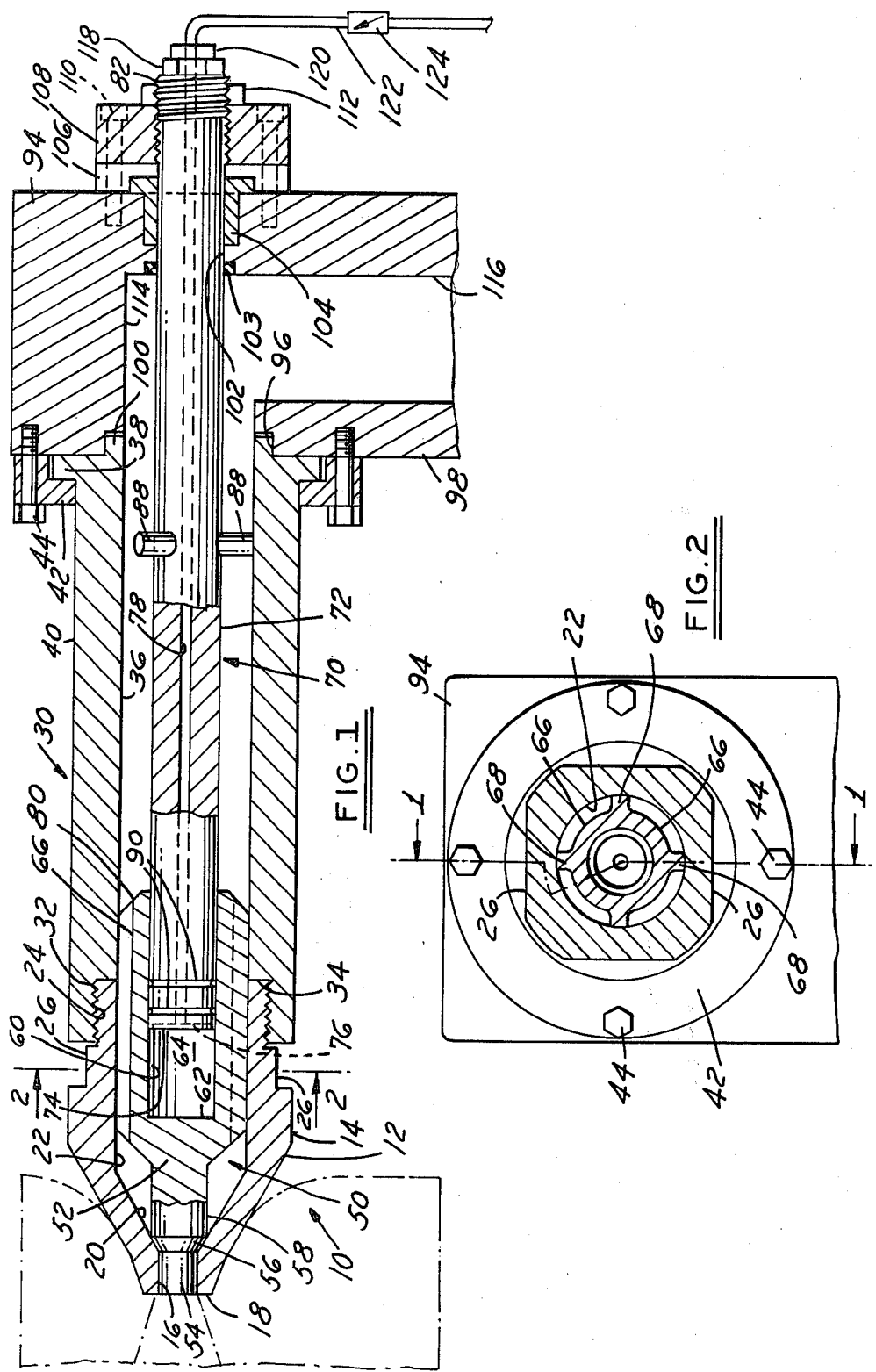
FIG. 1 is a cross-section of the injection molding nozzle in its closed or shut-off position.
FIG. 2 is a cross-section of the plunger taken along lines 2—2 of FIG. 1.

Referring now to FIG. 1, the injection nozzle assembly consists of a nozzle tip 10, a plunger means 50, a control rod means 70 and a nozzle body 30, attached to a manifold means 94. The nozzle tip 10 is a frusto-conical shape having an outer surface 12 and an outside diameter 14. The end 18 of the nozzle tip has a bore 16 which passes therethrough and mates with the internal tip surface 20. This conical surface 20 blends to the tip flow bore 22 comprising the plasticized flow path through the nozzle tip. The nozzle tip 10 has threads 24 on one end for affixng the nozzle tip 10 to the nozzle body 30 via nozzle threads 32. Surfaces 26 provide a wrenching surface to tighten the nozzle to the body. The body 30 has an outside diameter 40 and an inside bore 36 with a flange 38 at one end which is connected to the body 40. A ring clamp 42 has bolts 44 which mount the nozzle body 40 to manifold 94. The nozzle body has a pilot 100 which engages counter bore 96 on manifold 94.

Referring back to FIG. 1 at the nozzle end. Inside the nozzle tip is plunger means 50 which has a plunger body 52 and a plunger shut-off diameter 54 which is connected to chamfer 56 and plunger diameter 58. A bore 60 inside the plunger means 50 is terminated in surface 62. A chamber 64 is formed between the end of the control rod means 70, surface 74, the plunger surface 62 and diameter 60. Referring also to FIG. 2, the plunger body has arcuate surfaces 66 and plunger flutes or ribs 68 which engage nozzle tip bore 22. A flow path is formed by the arcuate surface 66, bore 22 and the flutes 68 whereby plasticized resin will flow into the tip of the nozzle. The control rod means 70 has an outside diameter 72 which engages bore 60 of the plunger means 50. At the end of diameter 72 which engages the plunger means are located balancing grooves 90 and a counter bore 76. Passing through the center of control rod 72 is bore 78 which carries fluid pressure into chamber 64. Located approximately halfway back on the control rod 72 are rod pins 88, better seen in FIG. 4. These pins assist in guiding and holding the control rod centered in the bore 36 during the operation of the nozzle. It is obvious that additional guide pins could be mounted if necessary to the control rod means 70.

Referring back to FIG. 1. At the right hand end is located a bushing 104 mounted in manifold 94 through which the control rod passes. A seal 103 is located in the manifold 94 on the rod diameter 72. The bore 102 is a clearance hole for the passage of the control rod elements. The bushing is held in place by spacer 106 and located at the end of the control rod are threads 82 which engage the sleeve nut 108 which is held to the manifold 94 by screws 110. The screw thread 82 can pass through spacer 106 and bushing 104. A hexigon shape adjusting means 118 is located on the extreme end of the control rod. A fitting 120 is mounted into the end of control rod 70 and has lines 122 connecting from fitting 120 to a control valve 124. Piping to the control valve 124 will come from a convenant pressure source. The manifold 94 to which the nozzle means 30 and the adjusting means 108 are attached has a bore 114 which intersects with cross-bore 116 for the delivery of plasticized resin to the nozzle tip.

OPERATION

In FIG. 1, the nozzle is shown in the shut-off condition. Assume the nozzle has been installed in a machine and is engaging a mold means not shown. The plasticized resin from the extruder would enter the manifold 94 passing through cross bore 116 and into bore 114. The melt then will proceed through bore 36 passing around the guide pins 88 and toward the plunger and then pass through the plunger openings which are formed by the arcuate surface 66 and the flutes 68 on the plunger means 50 and bore 22 best seen in FIG. 2. The plasticized resin would then flow into the tip of the nozzle formed by bore 22 and surface 20.

The initial entrance of plasticized resin into the nozzle with the plunger means 50 in the closed position will trap resin in the volumetric chamber formed by bore 22, surface 20 and plunger diameter 58. As the pressure in the chamber increases, the force developed against the frontal area of the plunger will be greater than the force on the rearmost surface of the plunger, thereby causing the plunger to move toward the right removing tip 54 from bore 16 as viewed in FIG. 1. The force difference is caused by a differential area between the front or tip end of the plunger and the opposite or rod end. Since the frontal area is greater the plunger will move and open the nozzle tip. Surface 62 on the plunger would then contact surface 74 on the control rod and the nozzle would be in its fully opened position. This position shown in FIG. 3 would be the maximum amount of flow that could occur through the nozzle tip 10. This volume is in direct relation to the area between the plunger tip diameter 54 and the surface 20 which is a function of the distance the plunger moves (X) and the angle ($\theta$) of surface 20.

Viewing FIG. 1, the control rod can be adjusted by loosening the jam nut 112 on control rod threads 82, and then rotating the control rod 70 by adjusting means 118. The rod will move forward toward the tip thereby decreasing the distance between surfaces 62 of the plunger and surface 74 of the control rod. Upon completion of this adjustment, the jam nut would then be tightened and the position of the tip of the plunger would be moved toward the left as viewed in FIG. 3, thereby reducing the X distance and, hence, the area between the end of the plunger 54 and surface 20 of the nozzle tip. As this area is decreased, the volume of plasticized resin at a given pressure that can be injected through the nozzle tip is decreased. By this means, the amount of resin to be injected can be accurately controlled.

Typically in a structural foam molding machine an accumulator stores the resin prior to the injection. Upon completion of the injection step the pressure of the resin in the manifold falls as the injection ram pressure is reduced. The nozzle is shut off by the fluid pressure through control valve 124 through line 122 and fitting 120 into the rear of control rod 70 to passage 78 through the center of control rod 70 and will enter counter bore 76. As the manifold pressure and hence the resin pressure in the nozzle falls, the fluid trapped in counter bore 76 will overcome the lowered resin pressure and the plunger 50 will begin to move forward forming chamber 64. As chamber 64 expands, the tip 54 of the plunger will engage the nozzle bore 16 shutting off the flow of plasticized resin to the mold and purging the nozzle tip of any resin. As can be seen in FIG. 1 when the plunger is in its fully forward position, the end of the plunger will be flush with the end of the nozzle tip surface 18. Some amount of gas or fluid seepage will occur between diameter 72 of control rod 70 and bore 60 of plunger means 50. Grooves 90 in control rod 70 are pressure balancing grooves which will keep the plunger centered on the control rod and prevent binding.

The nozzle tip can be removed easily for servicing from the barrel or nozzle body 30. Wrenching surfaces 26 provide a means to grip the nozzle tip so it can be rotated and removed from the barrel. The nozzle then can be cleaned, modified or changed if necessary. Also the plunger is readily available so that it too could be removed from the bore 36 and serviced. The control rod 70 may also be removed from the nozzle body by removal of the lock nut 112 and fitting 120 and then slide the rod through the bushing 104 and spacer 106 and manifold opening 102. The seal 103 would also be easily changed with the rod 70.

During the injection process when plasticized resin is flowing through the manifold and nozzle bore to the tip, the pressure of the fluid to the rod would be held at a lower pressure. The injection pressure is so much greater that the force developed easily overcomes the force developed by the pressure in chamber 64 and the plunger moves toward the right as viewed in FIG. 1. The fluid or gas that may be used could be hydraulic fluid capable of the temperature operation of the plasticized resin or dry nitrogen or some other inert gas which is capable of operating in a metal seal environment. It should also be noted that for clarity sake, the nozzle body heaters or heater elements have not been included on the nozzle but would, or course, be wrapped around diameters 40 to maintain the temperature of the melt as it passes through the nozzle body. In addition to the rod pins 88 shown in FIG. 1, additional rod pins could be placed on the control rod and the nozzle bore extended to facilitate deep, type molds. The length of the nozzle body 30 is just shown for convenience and could, of course, be much longer. It should further be noted that a plurality of nozzle assemblies could be attached to the manifold and could be operated simultaneously without difficulty.

In summary, my invention comprises an adjustable control rod interacting with a plunger which engages a nozzle tip whereby the flow of plasticized resin will cause the plunger to disengage from the nozzle tip, move a predetermined distance to open the nozzle and allow the flow of plasticized resin into the mold. Upon completion of the injection of the plasticized resin and a subsequent drop in injection pressure, a fluid or gas such as dry nitrogen will pass through the control rod will cause the plunger to shut off the flow of plasticized resin. The invention includes the means to accurately adjust the flow of plasticized resin around the plunger and through the nozzle tip.

It is obvious that other means for adjusting the control rod and other fluids or gasses could be used for causing the plunger to engage the nozzle tip but it is believed that any other embodiments may be made without departing from the spirit and scope of my invention. It being understood that this invention is not limited to the embodiments so disclosed.

I claim:

1. An apparatus for controlling the flow of plasticized resin through a nozzle assembly comprising:
    (a) a nozzle tip means attached to a nozzle body means, said body means affixed to a manifold means;
    (b) passage means internal to said manifold means communication with a bore in said nozzle body means and in communication with bore in said nozzle tip means;
    (c) plunger means internal to said nozzle assembly in cooperating engagement with said nozzle tip means;
    (d) a control rod means, having a longitudinal bore therein, coacting with said plunger means and forming a chamber therein;
    (e) said control rod means adjustably attached to said manifold means for controlling the displacement of said plunger means to vary the flow of plasticized resin;
    (f) said plunger means is operated to an open position by a force developed by the resin acting on a differential area of said plunger and;
    (g) said plunger is operated to a closed position by a force developed by fluid pressure in said chamber means.

2. The apparatus of claim 1 wherein the area ratio between the nozzle tip end of the plunger and the control rod engaging end is greater than one.

3. The apparatus of claim 2 wherein said adjusting means comprises a threaded member affixedly held to said manifold engaging a thread portion on said control rod means;

4. The apparatus of claim 3 wherein the minimum engagement of said control rod into said plunger means is twice the diameter of said control rod.

5. The apparatus of claim 1, 3, or 4, wherein the fluid source for operating said plunger means is dry nitrogen.

6. The apparatus of claim 1, 3, or 4, wherein the fluid source for operating said plunger means is compressed air.

7. The apparatus of claim 1 wherein said fluid pressure is maintained continuously in said chamber during operation of the nozzle.

* * * * *